(No Model.)
M. WOODHULL.
VEHICLE SPRING.
No. 598,465.   Patented Feb. 1, 1898.
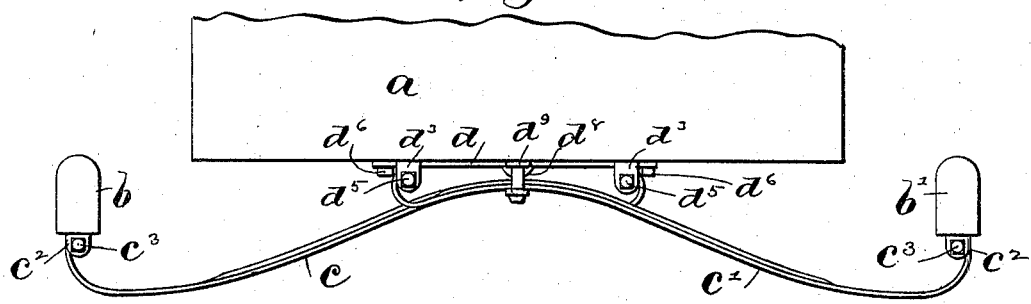
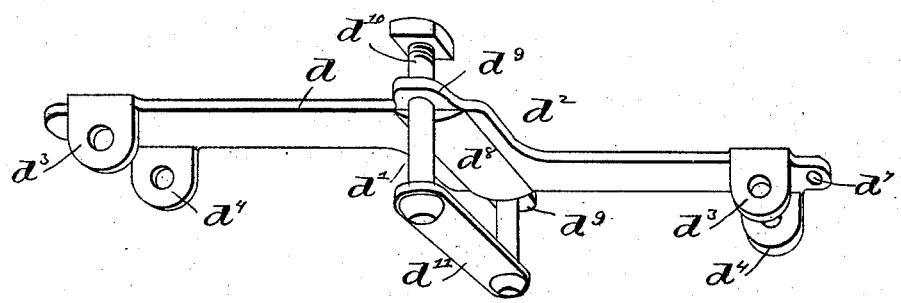
Witnesses
G. M. Gridley
Chas. I. Welch
Inventor
Morris Woodhull
By his Attorney

UNITED STATES PATENT OFFICE.

MORRIS WOODHULL, OF DAYTON, OHIO.

VEHICLE-SPRING.

SPECIFICATION forming part of Letters Patent No. 598,465, dated February 1, 1898.

Application filed September 28, 1897. Serial No. 653,406. (No model.)

*To all whom it may concern:*

Be it known that I, MORRIS WOODHULL, a citizen of the United States, residing at Dayton, in the county of Montgomery and State of Ohio, have invented certain new and useful Improvements in Vehicle-Springs, of which the following is a specification.

My invention relates to improvements in vehicle-springs, and it especially relates to that class of springs used on side-bar vehicles.

The object of my invention is to provide means for attaching the springs to the body of the vehicle in such a manner as to permit the independent action of each spring and to utilize the elasticity of the entire length of the respective springs and at the same time allowing the springs to be easily removed and applied.

The invention consists in the constructions and combinations of parts hereinafter described, and set forth in the claims.

In the accompanying drawings, Figure 1 is a rear view of the body and side-bars of a vehicle, showing my improved device applied thereto. Fig. 2 is a perspective view of the saddle for attaching the springs to the body of the vehicle.

Like parts are represented by similar letters of reference in both views.

In the said drawings, $a$ represents a vehicle-body, and $b$ and $b'$ the side-bars thereof. The vehicle-body $a$ is supported from said side-bars by springs $c$ and $c'$, which springs are preferably of the usual double-curve-leaf construction, the outer ends of said springs being curved upwardly and formed with eyes, by means of which they are attached to the under sides of the respective side-bars by means of bolts $c^3$, the side-bars being formed with lugs $b^2$ for this purpose. The other or inner ends of the respective springs are attached to the under side of the vehicle-body in such a manner that the springs cross each other. For this purpose and in order to form a fulcrum for the respective springs I provide a saddle $d$. This saddle $d$ is preferably formed of a single piece of metal, preferably offset at $d'$ $d^2$, as shown, so that the respective ends or halves thereof lie in different vertical planes. The respective ends are each provided with perforated lugs or projections $d^3$ $d^4$, between which the inner ends of the respective springs are pivoted by bolts $d^5$ or otherwise, the spring $c'$ being attached to the end of the saddle farthest from the side-bar to which said spring is attached and the spring $c$ to the opposite end of said saddle, so that the respective springs cross each other. The saddle $d$ is secured to the under side of the body of the vehicle by means of bolts $d^6$, which pass through perforations $d^7$ in the respective ends of said saddle.

Midway between the ends of the saddle $d$ and extending across that portion of said saddle lying between the respective offsets I provide a rounded raised surface or projection $d^8$, against which the convex sides of the inner curves of the respective springs rest and which is adapted to form a fulcrum for said springs. Adjacent to the respective ends of this elevated fulcrum I provide perforated ears or lugs $d^9$, through which are adapted to pass bolts $d^{10}$, which bolts also pass through the bottom of the vehicle-body and through a cross-tie $d^{11}$, by means of which the springs are held against the fulcrum, said bolts and cross-tie also assisting in holding the respective parts to the body of the vehicle.

It will be seen from the above description that I provide a simple and effective vehicle-spring and saddle, the construction being such that the springs are adapted to act independently of each other and also permitting the utilization of the elasticity in the entire length of the respective springs. At the same time the use of the saddle saves the vehicle-body from rack in use and allows the springs to be easily applied and removed.

Having thus described my invention, I claim—

1. In a vehicle-spring, the combination with two cross side-bar springs, of a solid continuous saddle having offset portions each provided at the end with connecting devices, and an elevated fulcrum midway between said connections and adapted to form a seat for both springs which extend in opposite directions from the connecting-points, substantially as specified.

2. In a vehicle-spring, a saddle formed at its respective ends with connecting-points for springs which extend in opposite directions, said connecting-points being in different vertical planes on said saddle with relation to each other, a fulcrum for said springs midway between said connecting-points, and a tie-bar for holding said springs against said fulcrum, substantially as specified.

In testimony whereof I have hereunto set my hand this 22d day of September, A. D. 1897.

MORRIS WOODHULL.

Witnesses:
ROGER S. WOODHULL,
J. C. TYSON.